(12) United States Patent
Diosi et al.

(10) Patent No.: US 7,878,305 B2
(45) Date of Patent: Feb. 1, 2011

(54) OIL-BEARING SHAFT THAT SUPPLIES LUBRICATION TO THE COMPONENTS OF A TRANSMISSION

(75) Inventors: Gabor Diosi, Friedrichshafen (DE); Josef Haupt, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 315 days.

(21) Appl. No.: 11/734,941

(22) Filed: Apr. 13, 2007

(65) Prior Publication Data

US 2007/0284193 A1 Dec. 13, 2007

(30) Foreign Application Priority Data

Apr. 22, 2006 (DE) .................. 10 2006 018 793

(51) Int. Cl.
*F16C 3/02* (2006.01)
*F16N 7/36* (2006.01)

(52) U.S. Cl. .............. 184/6.18; 184/6.16; 184/7.2; 184/26; 184/27.1; 184/105.1; 418/55.6; 418/87; 418/88; 418/94; 464/13; 464/14; 440/88 C; 440/88 L; 123/196 W; 123/196 R

(58) Field of Classification Search ........ 184/6.18, 184/6.16, 6.17; 264/241, 259, 267; 418/55.6; 384/404, 474

See application file for complete search history.

(56) References Cited

U.S. PATENT DOCUMENTS

| | | | |
|---|---|---|---|
| 2,823,768 A * | 2/1958 | Taylor | 184/7.2 |
| 5,019,733 A * | 5/1991 | Kano et al. | 310/61 |
| 5,215,161 A * | 6/1993 | Kobayashi | 180/248 |
| 5,711,730 A * | 1/1998 | Friedman et al. | 474/18 |
| 5,885,066 A * | 3/1999 | Matsumoto et al. | 418/55.6 |
| 6,506,136 B2 * | 1/2003 | Schmid et al. | 474/18 |
| 6,752,605 B2 * | 6/2004 | Dreiman et al. | 418/5 |
| 2006/0191746 A1 | 8/2006 | Diosi et al. | |

FOREIGN PATENT DOCUMENTS

DE 103 33 432 A1 2/2005

* cited by examiner

*Primary Examiner*—Robert A Siconolfi
*Assistant Examiner*—San Aung
(74) *Attorney, Agent, or Firm*—Davis & Bujold, P.L.L.C.

(57) ABSTRACT

An oil-bearing shaft (1) through which the lubrication for components of a transmission is provided, comprising at least one longitudinal bore hole (2) and at least one oil supply bore hole (2) with one longitudinal bore hole (2), each fluid-mechanically connected, whereby the oil supply bore hole (2) is oriented with a setting angle β is proposed.

20 Claims, 2 Drawing Sheets

DIRECTION OF ROTATION

OIL-BEARING SHAFT THAT SUPPLIES LUBRICATION TO THE COMPONENTS OF A TRANSMISSION

This application claims priority from German Patent Application Serial No. 10 2006 018 793.8 filed Apr. 22, 2006.

FIELD OF THE INVENTION

The present invention pertains to an oil-bearing shaft that supplies lubrication to the components of a transmission, particularly to the drive shaft of an automatic transmission with central lubrication.

BACKGROUND OF THE INVENTION

According to the current state of technology, the lubrication of transmission components by means of oil-bearing shafts is known. The known shafts possess at least one axial bore hole, through which a liquid medium can flow. Radial bore holes are further provided in the shaft for radially, outwardly directing the flow of the liquid medium. These radial bore holes communicate with the axial bore hole, allowing the flow of the liquid medium.

Such oil-bearing shaft is described in the applicant's patent application DE 103 33 432. It includes bore extending coaxially and/or axially parallel relative to the longitudinal axis of the shaft, as well as no less than two oil-bearing channels located to direct oil flow outwardly from the bore these two or more channels are separate from each other. In order to employ several oil-bearing channels in a comparatively thin shaft, the channels are constructed on the interior wall of the shaft in the form of channels, which are open throughout their longitudinal extension, and separated and sealed against each other by a pipe that is inserted into the shaft interior. At least one radial lubrication bore hole and/or supply bore hole is provided in the shaft according to DE 103 33 432 A1.

An oil-bearing shaft, which, according to the current state of technology, has a radial supply bore hole. This shaft at a high rotational speed, has a problem due to centrifugal force, which creates a pressure opposing the lubrication pressure, such that only an insufficient amount of medium and/or lubricating oil can be supplied through the shaft through to radial oil supply bore holes. This results in the pressure within the axial bore hole dropping, relative to the increasing distance to the mediums' supply point and/or the oil supply bore hole.

The oil supply's dependency on rotational speed can, in the case of an automatic transmission with lubrication supplied by the drive shaft, result in the fact that with increased rotational speed, the last oil user, i.e. a planetary gear, will adversely receive an insufficient amount of lubricating oil.

SUMMARY OF THE INVENTION

The present invention is based on the objective of providing an oil-bearing shaft which supplies lubrication to the components of a transmission, where the dependency of the oil supply on rotational speed is reduced so that lubrication of all components is assured even when the oil-bearing shaft is rotating at high speeds.

Accordingly, an oil-bearing shaft is proposed, comprising of at least one longitudinal bore hole as well as at least one oil supply bore hole with one longitudinal bore hole, each connected fluid-mechanically, whereby the oil supply bore hole is not positioned radially, but with a setting angle β (unequal to zero).

The oil supply bore hole, positioned according to the present invention, creates an impulse vector that positively counteracts the centrifugal force, which is dependant on the rotational speed, and thus partially compensates for it.

The dependency of the oil supply on rotational speed in an oil-bearing shaft is reduced in the present invention by simple and cost-efficient means. This will, in the case of a drive shaft of a transmission with central lubrication, result in an increased life expectancy of the gear sets and clutches. Moreover, the functional safety of the transmission is increased (i.e. through the complete filling of the equalizing areas).

BRIEF DESCRIPTION OF THE DRAWINGS

The invention is clarified in greater detail below on the basis of the appended illustrated diagrams, wherein.

DETAILED DESCRIPTION OF THE PREFERRED EMBODIMENTS

Figure 1:
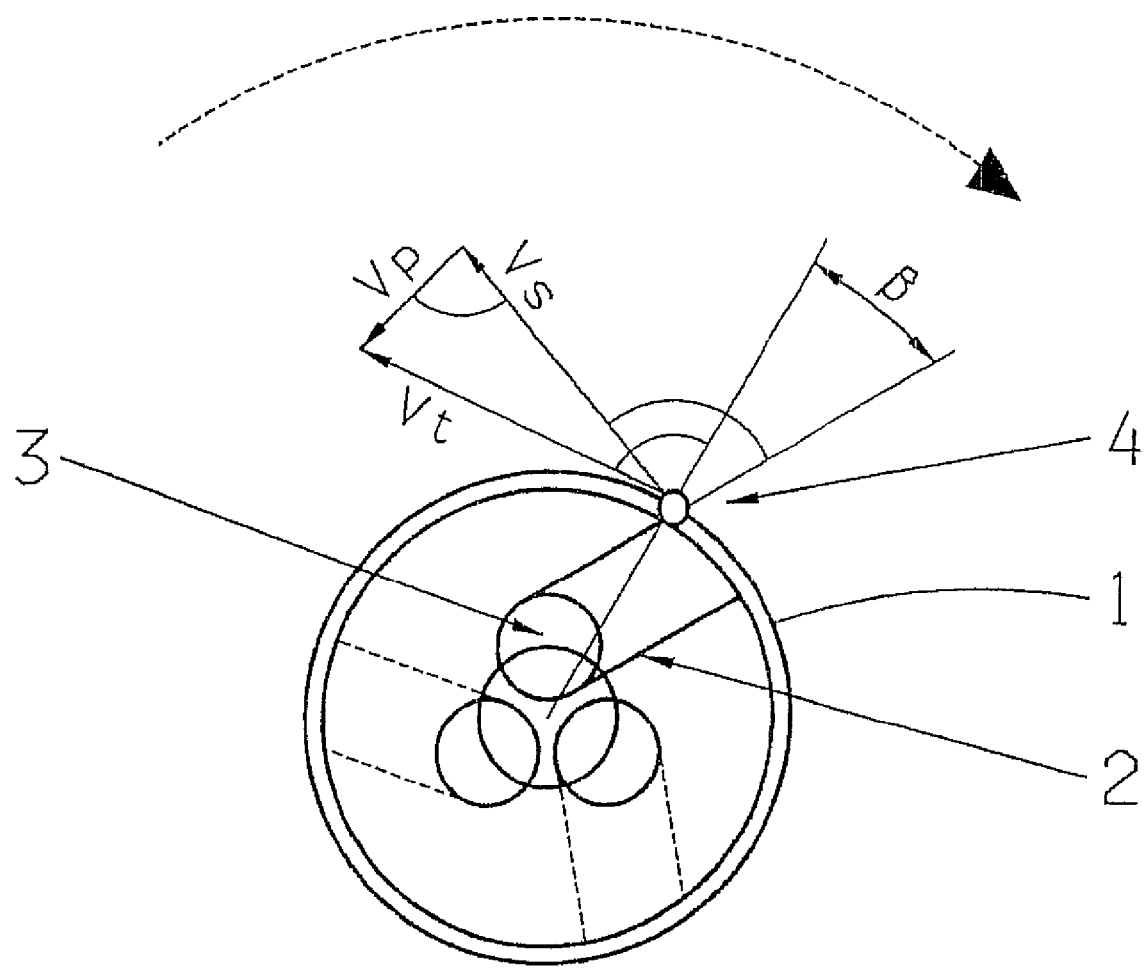
FIG. 1 is a schematic sectional view through an oil-bearing shaft constructed in accordance with the invention.

FIG. 1 illustrates an oil-bearing shaft 1 with multiple longitudinal bore holes 3 configured according to the invention. As can be seen in the drawing, an oil supply bore hole 2 is oriented at an angle β and with respect to fluid-mechanically connected with a longitudinal bore hole 3. The angle β creates an impulse vector v_p at the oil column, which works in opposition to the rotational speed-dependent centrifugal force and partially compensates for it. A drop of oil 4 is used to illustrate this fact in the diagram.

Figure 2:
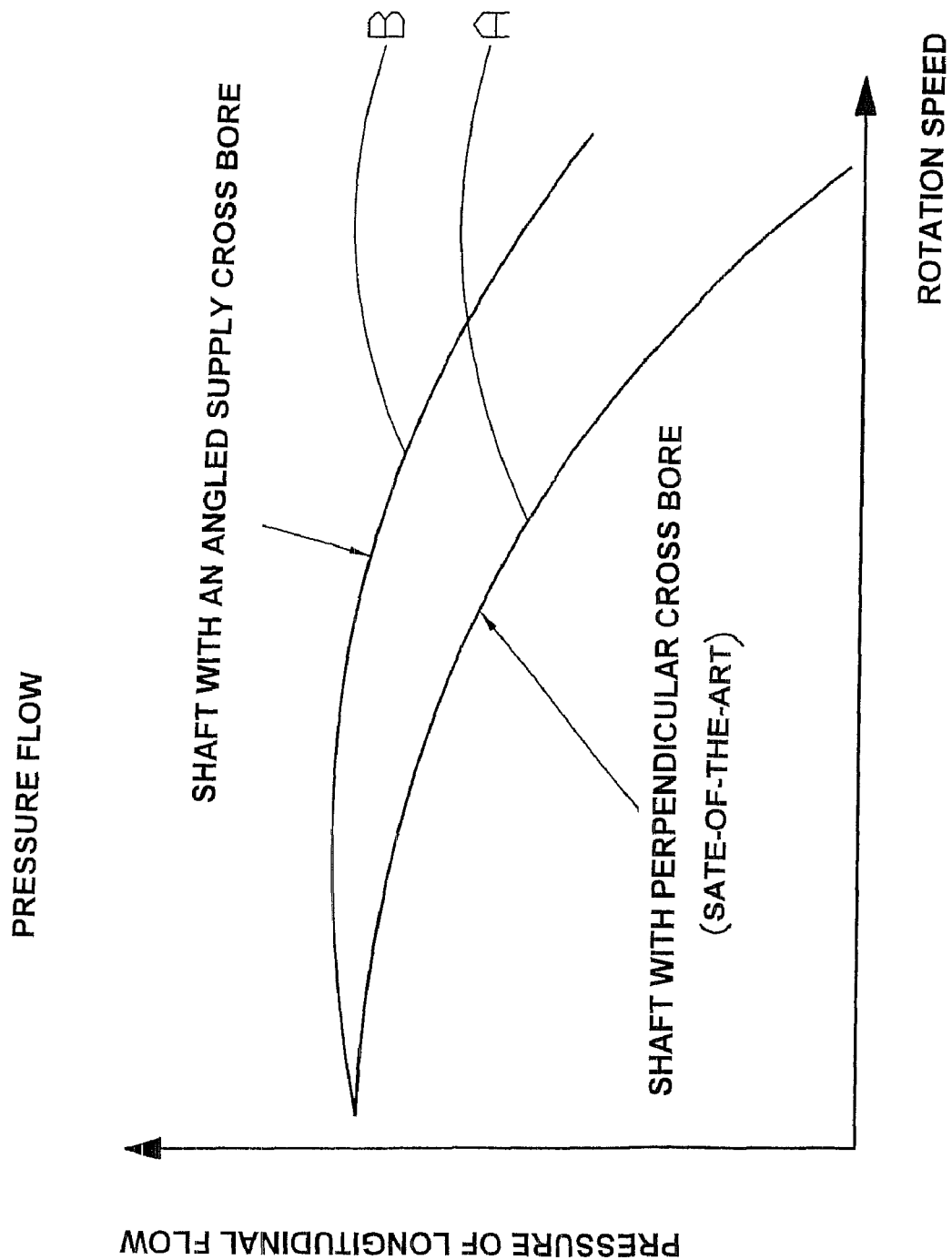
FIG. 2 is a diagram representing the pressure distribution in the axial and/or longitudinal bore hole of an oil-bearing shaft within the range of a user that is at a distance from the supply bore hole as function of the rotational speed of the shaft, according to the state of the art and according to the present invention.

FIG. 2 illustrates the decline of oil, supplied to a user, remote from the supply bore hole, of the oil supply on rotational speed for depending on the rotation speed of the shaft with curve A representing a radially extending supply bore hole and curve B representing a supply bore hole positioned according to the invention. As can be seen in the diagram, the concept according to the present invention assures the presence of a sufficient oil supply in the longitudinal bore hole of the shaft even at high rotational speeds.

An oil-bearing shaft configured according to the invention may be positively applied as drive shaft for an automatic transmission with central lubrication, whereby sufficient lubrication of all components to be lubricated by the drive shaft is guaranteed.

REFERENCE NUMBERS 1 oil-bearing shaft
2 supple bore hole
3 longitudinal bore hole
4 oil drop
A Pressure distribution in the longitudinal bore hole as function of the rotational speed according to the state of the art
B Pressure distribution in the longitudinal bore hole as function of the rotational speed according to the invention
β Setting angle
v_p Impulse vector

The invention claimed is:

1. An oil-bearing shaft for supplying a lubrication fluid for at least one component of a transmission, the shaft comprising at least one longitudinally extending bore hole and at least one oil supply bore hole extending to an outer diameter of the shaft, and each of the at least one longitudinally extending bore hole and the at least one oil supply bore hole being fluid-mechanically connected for supplying lubrication fluid from said outer diameter of the shaft radially inward to the at least one longitudinal bore hole during rotation of the shaft, wherein each of the at least one oil supply bore hole (2), imputted with lubrication fluid, is inclined in a direction of rotation by a setting angle ($\beta$) with respect to a vertical of a central longitudinal axis of the shaft, a central longitudinal axis of the at least one oil supply bore hole (2) is spaced from and does not intersect with the central longitudinal axis of the shaft and an intersection of the at least one oil supply bore hole (2) with the outer diameter of the shaft leads an intersection of the oil supply bore hole (2) with the longitudinally extending bore hole in the direction of rotation of the shaft.

2. The oil-bearing shaft according to claim 1, wherein a drive shaft of an automatic transmission is constructed with a central lubrication fluid.

3. An oil-bearing shaft for supplying a lubrication fluid for at least one component of a transmission, the shaft comprising at least one longitudinally aligned bore hole and at least one oil supply bore hole in fluid communication with the at least one longitudinally aligned bore hole, the at least one oil supply bore hole extends radially, from the longitudinally aligned bore hole, to an exterior of the shaft at an angle from a line extending through the axis of the longitudinally aligned bore hole and a central axis of the shaft, when viewed along a longitudinal axis of the longitudinally aligned bore hole, and an intersection of the at least one oil supply bore hole (2) with an outer diameter of the shaft leads an intersection of the oil supply bore hole with the longitudinal bore hole in the direction of rotation of the shaft, all of the oil supply bore holes being inclined in a direction of rotation by an angle with respect to a line vertical to the central axis and spaced apart from the longitudinal axis of the shaft with an intersection of the at each oil supply bore hole with the outer diameter of the shaft leading an intersection of the oil supply bore hole with the longitudinal bore hole in the direction of rotation of the shaft so as to pump lubrication fluid radially inward, during rotation of the shaft in the direction of rotation, and supply the lubrication fluid to the at least one component of a transmission.

4. The oil-bearing shaft according to claim 3, wherein the shaft is a drive shaft of the transmission and provides central lubrication for the transmission.

5. The oil-bearing shaft according to claim 3, wherein the at least one oil supply bore hole extends from the longitudinally aligned bore hole, when viewed along the longitudinal axis of the longitudinally aligned bore hole, towards a direction of rotation of the shaft.

6. An oil-bearing shaft for supplying a lubrication fluid for at least one component of a transmission, the shaft comprising:

at least one centrally located longitudinally aligned bore hole extending longitudinally through the shaft, and at least one oil supply bore hole leading to an outer diameter of the shaft, and each of the at least one oil supply bore holes being connected with the at least one longitudinally aligned bore hole to permit the flow of fluid therethrough, wherein each of the at least one oil supply bore holes (2) is inclined in a direction of rotation by a setting angle ($\beta$) with respect to a vertical, extending normal to a central axis of the shaft, so as to create an impulse vector that counteracts and at least partially compensates for centrifugal force acting on the lubrication fluid during rotation of the shaft, and a central axis of each of the oil supply bore holes (2) is spaced radially apart from the central axis of the shaft so as to avoid intersecting with the central axis of the shaft so that rotation of the shaft in the direction of rotation, cause lubrication fluid to be pumped radially inward to supply the lubrication fluid to the at least one component of a transmission.

7. The oil-bearing shaft according to claim 6, wherein a central axis of each longitudinally aligned bore hole is spaced from the central axis of the shaft.

8. The oil-bearing shaft according to claim 7, wherein the central axis of the oil supply bore hole intersects the central axis of the longitudinally aligned bore hole with which the oil supply bore hole is connected.

9. The oil-bearing shaft according to claim 6, wherein the central axis of the oil supply bore hole intersects a central axis of the longitudinally aligned bore hole with which the oil supply bore hole is connected.

10. The oil-bearing shaft according to claim 6, wherein the shaft has three oil supply bore holes located about a circumference of the shaft, and each of three oil supply bore holes is substantially equidistance spaced from one another.

11. The oil-bearing shaft according to claim 6, wherein only one oil supply bore hole is fluidly connected to any longitudinally aligned bore hole at any axial location along a length of the shaft.

12. The oil-bearing shaft according to claim 11, wherein a plurality of longitudinally aligned bore holes extend longitudinally through the shaft parallel to one another.

13. The oil-bearing shaft according to claim 6, wherein a plurality of longitudinally aligned bore holes extend longitudinally through the shaft parallel to one another.

14. The oil-bearing shaft according to claim 6, wherein three longitudinally aligned bore holes extend longitudinally through the shaft parallel to one another, the three longitudinally aligned bore holes are spaced from one another and the central axis of the shaft, and each of the three centrally located longitudinal bore holes only communicates with one oil supply bore hole.

15. The oil-bearing shaft according to claim 1, wherein a central axis of each longitudinally aligned bore hole is spaced from the central axis of the shaft.

16. The oil-bearing shaft according to claim 15, wherein the central axis of the oil supply bore hole intersects with the central axis of the longitudinally aligned bore hole with which the oil supply bore hole is connected.

17. The oil-bearing shaft according to claim 1, the central axis of the oil supply bore hole intersects a central axis of the longitudinally aligned bore hole with which the oil supply bore hole is connected.

18. The oil-bearing shaft according to claim 6, wherein only one oil supply bore hole is fluidly connected to any longitudinally aligned bore hole at any axially location along a length of the shaft.

19. The oil-bearing shaft according to claim 18, wherein a plurality of longitudinally aligned bore holes extend longitudinally through the shaft parallel to one another.

20. The oil-bearing shaft according to claim 1 wherein a plurality of centrally located longitudinal bore holes extend longitudinally through the shaft parallel to one another.

* * * * *